(12) United States Patent
Yokota (10) Patent No.: US 8,330,894 B2
(45) Date of Patent: Dec. 11, 2012

(54) DISPLAY DEVICE

(75) Inventor: Yasuo Yokota, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 12/741,747

(22) PCT Filed: Oct. 24, 2008

(86) PCT No.: PCT/JP2008/003037
§ 371 (c)(1),
(2), (4) Date: May 6, 2010

(87) PCT Pub. No.: WO2009/063593
PCT Pub. Date: May 22, 2009

(65) Prior Publication Data
US 2010/0265428 A1    Oct. 21, 2010

(30) Foreign Application Priority Data
Nov. 15, 2007   (JP) .................................. 2007-296512

(51) Int. Cl.
*G02F 1/1333*    (2006.01)
(52) U.S. Cl. .......................................... 349/60; 349/58
(58) Field of Classification Search ................ 349/60, 349/58
See application file for complete search history.

(56) References Cited

U.S. PATENT DOCUMENTS

| 5,808,707 A | 9/1998 | Niibori et al. |
| 2003/0098642 A1 | 5/2003 | Tajima |
| 2004/0004680 A1 * | 1/2004 | Kim ................................ 349/58 |

FOREIGN PATENT DOCUMENTS

| JP | 1-181071 U | 12/1989 |
| JP | 4-028686 U | 3/1992 |
| JP | 8-032257 A | 2/1996 |
| JP | 9-073072 A | 3/1997 |
| JP | 9-329777 A | 12/1997 |
| JP | 2003-131580 A | 5/2003 |
| JP | 2003-216056 | 7/2003 |
| JP | 2003-228295 A | 8/2003 |

* cited by examiner

*Primary Examiner* — Wen-Ying P Chen
(74) *Attorney, Agent, or Firm* — Hamre, Schumann, Mueller & Larson, P.C.

(57) ABSTRACT

The present invention provides a display device that prevents damage on a display panel even when the display device drops or falls down during handling. The display device includes: a PDP (10) including a front panel (20) and a back panel (30) that have peripheral portions joined to each other by a sealing material (36); a chassis member (44) supporting the PDP (10); and a housing enclosing the PDP (10) and the chassis member (44). The housing includes a front housing portion (41), a front protective glass substrate (43) that closes an opening (54) provided in the front housing portion (41), a side housing portion (51), and a back housing portion (42). A supporting member (55) for forming specified gap D between itself and the front panel (20) is provided on the front protective glass substrate (43) or the front housing portion (41) so as to sit between the sealing material (36) and the opening (54).

3 Claims, 7 Drawing Sheets

DISPLAY DEVICE

TECHNICAL FIELD

The present invention relates to a display device having a structure for preventing cracks in and breakage of a glass substrate included therein when the display device drops or falls down.

BACKGROUND ART

In recent years, liquid crystal display devices using a liquid crystal display panel and plasma display devices using a plasma display panel (hereinafter simply referred to as a PDP) have been gaining attention as display devices suitable for achieving a reduction in thickness and an increase in size. These display devices have been produced in large quantities and sales thereof also have been increasing rapidly.

The PDP is composed of a pair of panels, a front panel and a back panel, each having a glass substrate. The front panel includes a front glass substrate on which a display electrode pair, a dielectric layer, a protective layer, etc. are formed. On the other hand, the back panel includes a back glass substrate on which a data electrode, a barrier rib, a phosphor layer, etc. are formed. The front panel and the back panel are disposed facing each other so that a minute discharge space is formed therebetween. A gap between a peripheral portion of the front panel and a peripheral portion of the back panel is sealed with a sealing material. The discharge space is filled with a discharge gas containing neon (Ne), xenon (Xe), etc.

A chassis member is attached to a back surface of the back panel of the PDP via a joining member such as an adhesive heat-conducting sheet and an adhesive agent, etc. A peripheral portion of the chassis member is fixed to a mounting metal piece with screws. The chassis member is a substrate for supporting the PDP and attaching thereto circuit boards on which a drive circuit for driving the PDP is formed. The chassis member also has a function of radiating effectively the heat generated by the PDP. Furthermore, the plasma display device includes a front frame and a back cover for protecting the PDP and the circuit boards. On a front side of the PDP, a front protective glass substrate is disposed spaced apart from a surface of the front panel of the PDP. The front protective glass substrate is attached to a front housing portion having an opening corresponding to an effective display region of the front panel of the PDP. The front protective glass substrate has functions of color tone correction, contrast improvement, and electromagnetic wave blocking.

In contrast to the back panel fixed by the chassis member, the front panel merely is fixed, at the peripheral portion thereof, only by a sealed portion composed of the sealing material. Therefore, when the plasma display device drops forward (with the front protective glass substrate facing down) during transportation or unpacking, the front panel is warped in the shape of a bowl taking the sealed portion as the supporting point, and has cracks and fractures.

In order to prevent these cracks and breakage, it can be considered to dispose a frame-shaped elastic member in a gap between the surface of the front panel and the front protective glass substrate along a peripheral portion of the effective display region, as disclosed in JP 2003-131580 A, for example. Such a configuration can enhance the impact resistance of the PDP in a plane direction and block the dust entering from outside. In addition, JP 2003-131580 A discloses to provide an elastic member to a sealed portion.

However, even when the elastic member is provided to the sealed portion serving as the supporting point of the warping as in the technique disclosed in JP 2003-131580 A, the deflection of the front panel itself cannot be suppressed, and thus the occurrence of cracks in the sealed portion cannot be suppressed. The frame-shaped elastic member has an effect of lowering slightly the degree of deflection of the front panel. However, since the elastic member is in contact with the front panel, an initial impact force is applied directly to the sealed portion provided at the peripheral portion of the front panel. This raises a problem in that the distortion is concentrated thereto causing cracks, and the front panel tends to have fractures easily. Moreover, when the elastic member is softened to reduce this initial impact force, the deflection cannot be suppressed.

DISCLOSURE OF INVENTION

The present invention is intended to resolve the above-mentioned problems and provide a display device capable of enhancing the impact resistance of a PDP against the forward dropping.

In order to accomplish the foregoing object, the present invention provides a display device including: a display panel including a front panel and a back panel that have peripheral portions joined to each other by a sealing material; a chassis member joined to the back panel of the display panel by a joining member, and a housing enclosing the display panel and the chassis member. The housing includes a front housing portion provided with an opening corresponding to an effective display region of the front panel, a front protective glass substrate fixed to the front housing portion so as to close the opening, a side housing portion coupled to the front housing portion, and a back housing portion that is coupled to the side housing portion and covers a back surface of the chassis member. A supporting member for restricting deflection of the front panel by contacting the front panel when the front panel is warped toward the front protective glass substrate is provided on the front protective glass substrate or the front housing portion so as to sit between the sealing material of the display panel and the opening.

Such a configuration causes no damage to the front panel in an ordinary use because the supporting member is not in contact with the front panel. When the display device drops forward (with the front protective glass substrate facing down), the front panel contacts the supporting member at a location on an inner side of the sealed portion serving as the supporting point of the warping. Thereby, it is possible to restrict the deflection of the front panel effectively and suppress the occurrence of cracks in the sealing material.

The supporting member may be a projection formed on the front protective glass substrate or the front housing portion. Such a configuration makes it easy to provide the supporting member.

Furthermore, the supporting member may be a plate member bent into a shape projecting toward the front panel. Such a configuration makes it possible to form the supporting member integrally with the plate-like mounting metal piece to be used for attaching the display panel and the chassis member to the side housing portion, and to reduce the parts count and assembly man-hours.

Furthermore, the supporting member may be contained in an elastic member inserted between the front panel and the front protective glass substrate or between the front panel and the front housing portion. With such a configuration, the function, performed by the elastic member, of preventing the entry of dust into the gap between the front panel and the effective display region of the front protective glass and the function, performed by the supporting member, of restricting the deflection of the front panel, can be realized with a single component.

It is desirable that the supporting member is composed of an elastic body having a higher hardness than that of the elastic member. With such a configuration, the impact generated by forward dropping is alleviated by the elastic member in a first stage and by the supporting member contained in the elastic member in a secondary stage. Accordingly, the impact force generated when the front panel contacts the supporting member can be alleviated and the breakage of the front panel can be suppressed.

Furthermore, it is preferable that an end portion of the supporting member on a side of the front panel has a specified curvature. Such a configuration can suppress damage from occurring to the front panel when the front panel contacts the end portion of the supporting member.

According to the present invention, even when a display device including a display panel, such as a PDP, drops forward, the breakage of the display panel can be suppressed. Thus, the present invention can provide a display device having an enhanced impact resistance.

BEST MODE FOR CARRYING OUT THE INVENTION

Hereinafter, embodiments of the present invention will be described with reference to the drawings. In the embodiments of the invention, a plasma display device will be described as a display device and a PDP will be described as a display panel.

(Embodiment 1)

Figure 1:
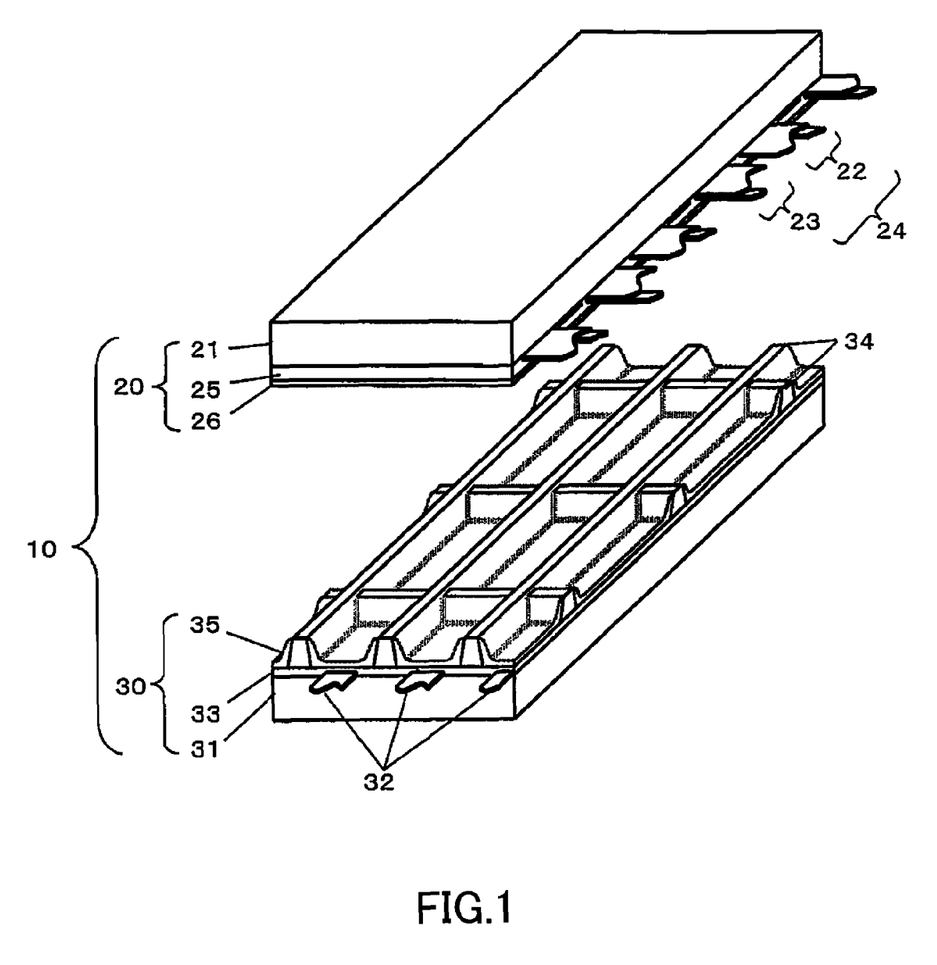
FIG. 1 is an exploded perspective view of a main part showing a basic configuration of a PDP used for a plasma display device as a display device.
Figure 2:
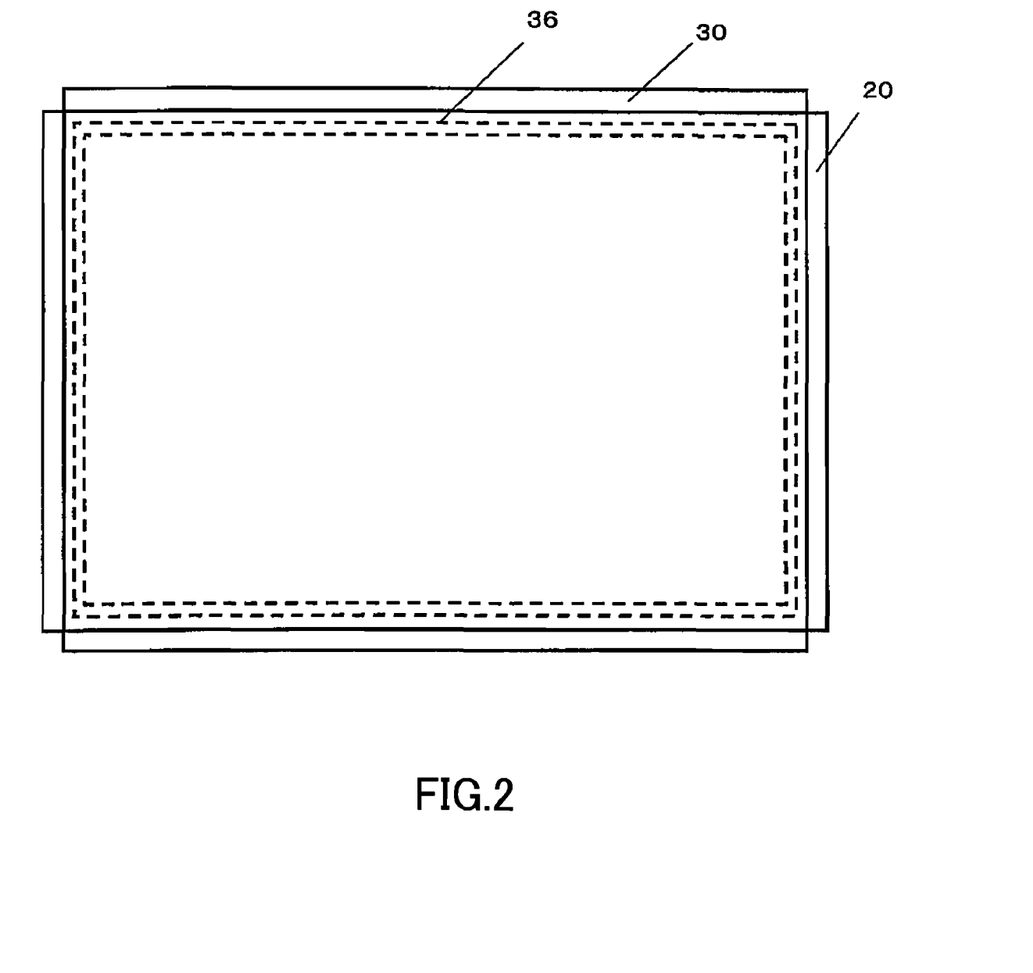
FIG. 2 is a plan view of the PDP.

FIG. 1 is an exploded perspective view of a main part showing a basic configuration of a PDP used for a plasma display device as a display device. FIG. 2 is a plan view of the PDP. A PDP 10 is composed of a front panel 20 and a back panel 30. The front panel 20 has a front glass substrate 21 on which a plurality of display electrode pairs 24 are formed. The display electrode pair 24 is composed of a scanning electrode 22 and a sustaining electrode 23 arranged in parallel with each other. A dielectric layer 25 is formed so as to cover the scanning electrode 22 and the sustaining electrode 23. A protective layer 26 is formed on the dielectric layer 25.

The back panel 30 has a back glass substrate 31 on which a plurality of data electrodes 32 are arranged in parallel with each other. A base dielectric layer 33 is formed so as to cover the data electrodes 32, and grid-like barrier ribs 34 further are formed thereon. Phosphor layers 35 that emit red, green, or blue light are formed in order for each of the data electrodes 32, respectively, on side surfaces of the barrier ribs 34 and on the base dielectric layer 33.

As shown in FIG. 2, the front panel 20 and the back panel 30 are disposed facing each other with a minute discharge space therebetween so that the display electrode pairs 24 intersect with the data electrodes 32. Peripheral portions of the front panel 20 and the back panel 30 are joined to each other by a sealing material 36, such as glass frit, so as to seal a gap between the peripheral portions. A mixed gas of neon (Ne) and xenon (Xe), for example, is sealed in the discharge space as a discharge gas. The barrier ribs 34 partition the discharge space into a plurality of sections. A discharge cell is formed at each of intersections between the display electrode pairs 24 and the data electrodes 32. Discharge is caused in the discharge cells. Ultraviolet rays generated by the discharge excite the phosphor layer 35 and light is emitted to display color images. The structure of the PDP 10 is not limited to the structure mentioned above. For example, the PDP 10 may include stripe-like barrier ribs.

Figure 3:
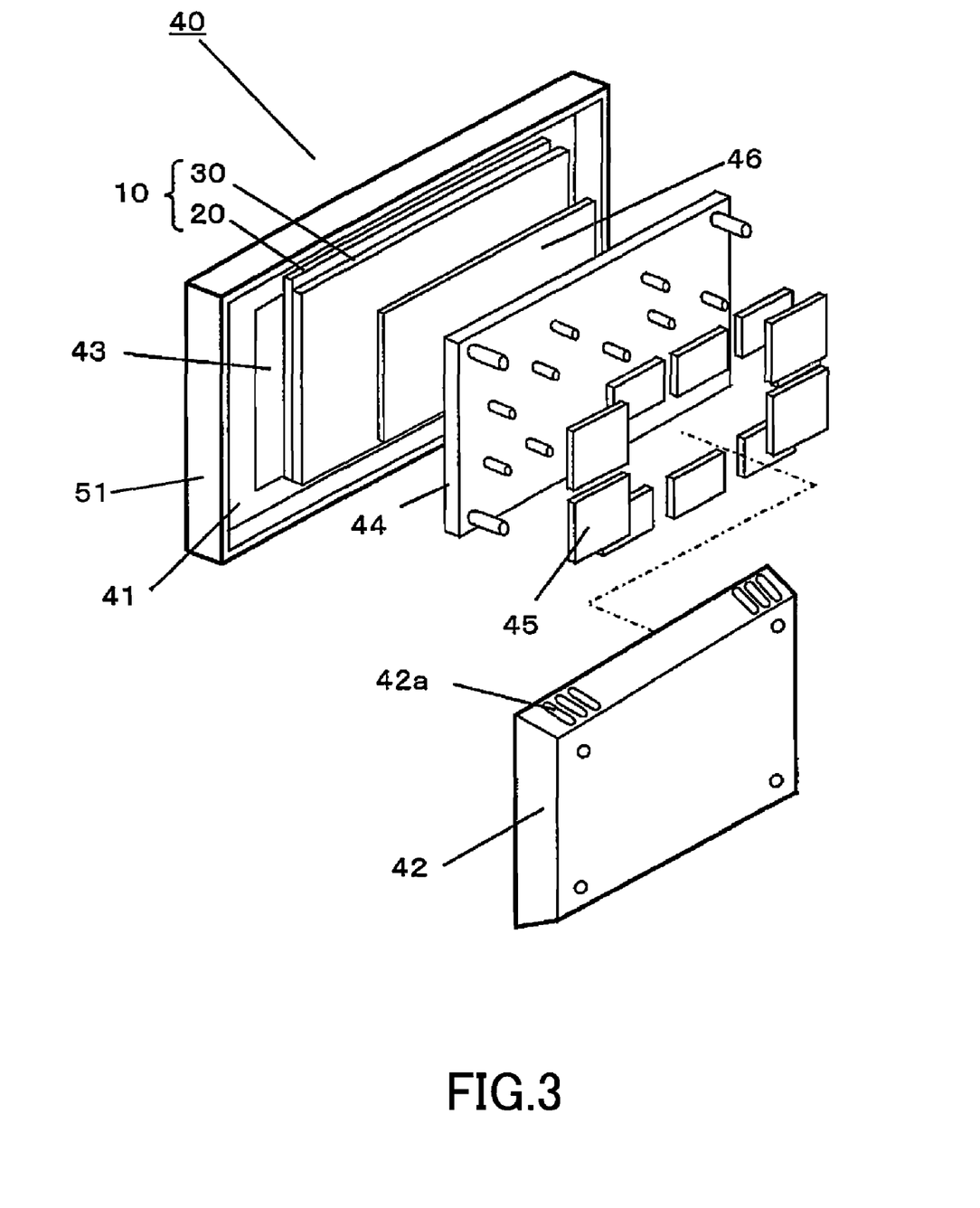
FIG. 3 is an exploded perspective view showing a main configuration of the plasma display device.

FIG. 3 is an exploded perspective view showing a main configuration of the plasma display device. A plasma display device 40 includes a housing accommodating the PDP 10 and a chassis member 44 to be described later. The housing is composed of a front housing portion 41, a front protective glass substrate 43, a side housing portion 51, and a back housing portion 42. The front housing portion 41 is in the shape of a rectangular plate disposed in front of the PDP 10. The side housing portion 51 has a rectangular cylindrical shape surrounding the PDP 10 from a direction perpendicular to its thickness direction. A front end portion of the side housing portion 51 is coupled to an outer peripheral portion of the front housing portion 41. The back housing portion 42 is a so-called back cover that is coupled to a back end portion of the side housing portion 51 and covers a back surface of the chassis member 44 to be described later. In the present embodiment, the front housing portion 41 and the side housing portion 51 compose a front frame.

The front housing portion 41 is provided with an opening corresponding to an effective display region of the front panel 20. The front protective glass substrate 43 including a glass substrate, for example, is fixed to the front housing portion 41 so as to close the opening from a side of the PDP 10. In this way, the front protective glass substrate 43 is disposed at the opening. The back panel 30 of the PDP 10 is joined to the chassis member 44 via a joining member 46. The chassis member 44 is composed of a metal plate made of aluminum (Al) or the like, and serves as a heat-radiating plate. The joining member 46 is formed of an adhesive material or a fusion material. The joining member 46 allows the back glass substrate 31 of the PDP 10 to be joined to the chassis member 44 almost entirely, and transfers the heat generated by the PDP 10 to the chassis member 44. Circuit boards 45 composing a circuit block for driving the PDP 10 are fixed to the chassis member 44.

The front protective glass substrate 43 serves a role of an optical filter as well as a role of protecting the PDP 10. Silver (Ag) vapor deposition, for example, is applied to the front protective glass substrate 43 in order to suppress unnecessary radiation of electromagnetic waves. The back housing portion 42 is provided with a plurality of ventilation holes 42a for releasing the heat generated by the PDP 10 and the circuit boards 45 to the outside. The circuit boards 45 are attached to a back surface side of the chassis member 44 and construct an electric circuit to drive the PDP 10 and control the driving. The circuit boards 45 are connected electrically to an extraction electrode part (not shown) extracted at an edge of the PDP 10, by a plurality of flexible wiring boards (not shown).

Figure 4A:
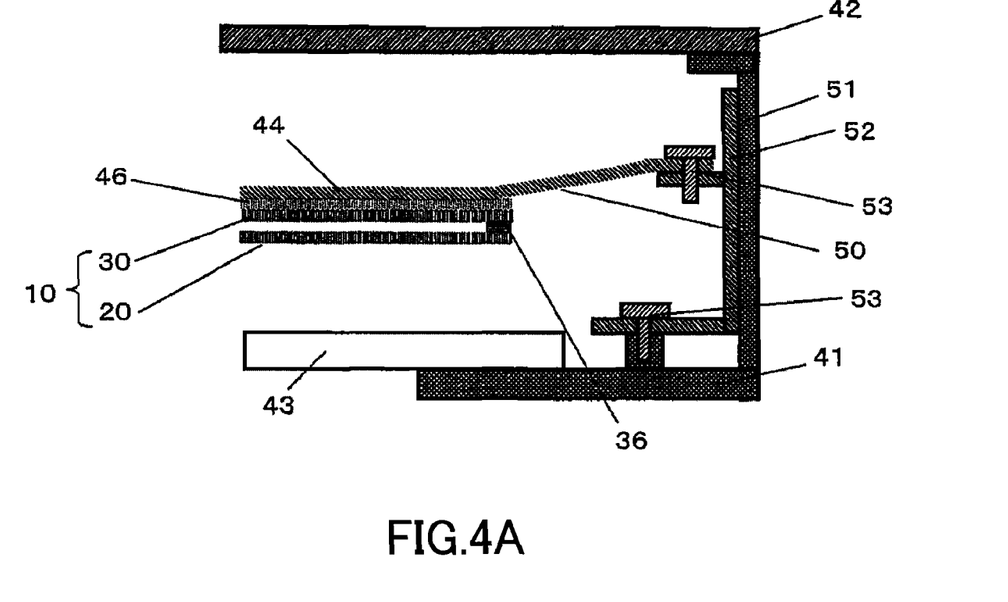
FIG. 4A and FIG. 4B each are a cross-sectional view showing a structure of the plasma display device.
Figure 4B:
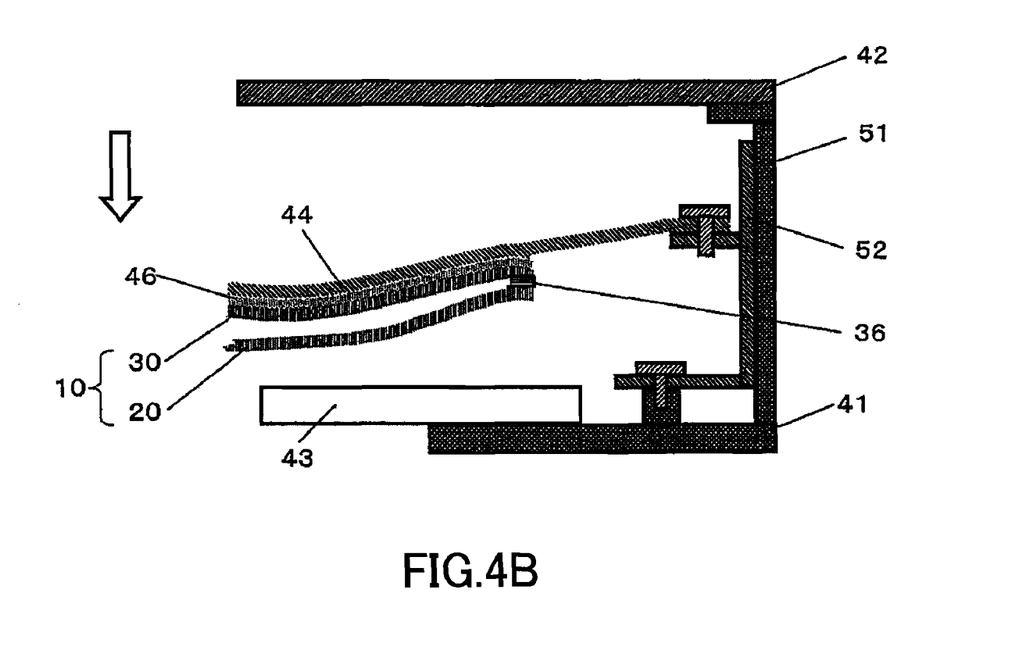

FIG. 4A and FIG. 4B each are a cross-sectional view showing a structure of the plasma display device 40. FIG. 4A is a cross-sectional view showing a structure of the plasma display device 40 in a stationary state. FIG. 4B is a cross-sectional view showing the plasma display device 40 when dropping with the PDP 10 side facing down.

As shown in FIG. 4A, the back panel 30 of the PDP 10, which has the peripheral portion joined to the front panel 20 by sealing using the sealing material 36, is fixed to the chassis member 44 by adhesion using the joining member 46 such as an adhesive sheet. The chassis member 44 has a mounting metal piece 50 that is an extended part thereof. The mounting metal piece 50 is fixed to a side housing mounting part 52 provided on the side housing portion 51 that is a part of the housing with screws 53. The side housing mounting part 52 is fixed also to the front housing portion 41 with screws 53. The front panel 20 and the front protective glass substrate 43 are spaced apart from each other keeping a specified distance therebetween.

When the plasma display device 40 thus configured drops in a direction indicated by the arrow shown in FIG. 4B, that is, in a direction of the front panel 20, during transportation or unpacking, the PDP 10 is warped into the shape of a bowl while the warpage of the chassis member 44 is superimposed thereon. However, since the front panel 20 is fixed to the back panel 30 by the sealing material 36 only at the peripheral portion, a central region of the front panel 20 is warped significantly taking the sealing material 36 as the supporting point. Accordingly, stress is applied to a region where the sealing material 36 is present, causing cracks in the sealing material 36 and fractures in the glass substrate in this region. As a result, the PDP 10 is broken by receiving the impact of the forward dropping.

Figure 5A:
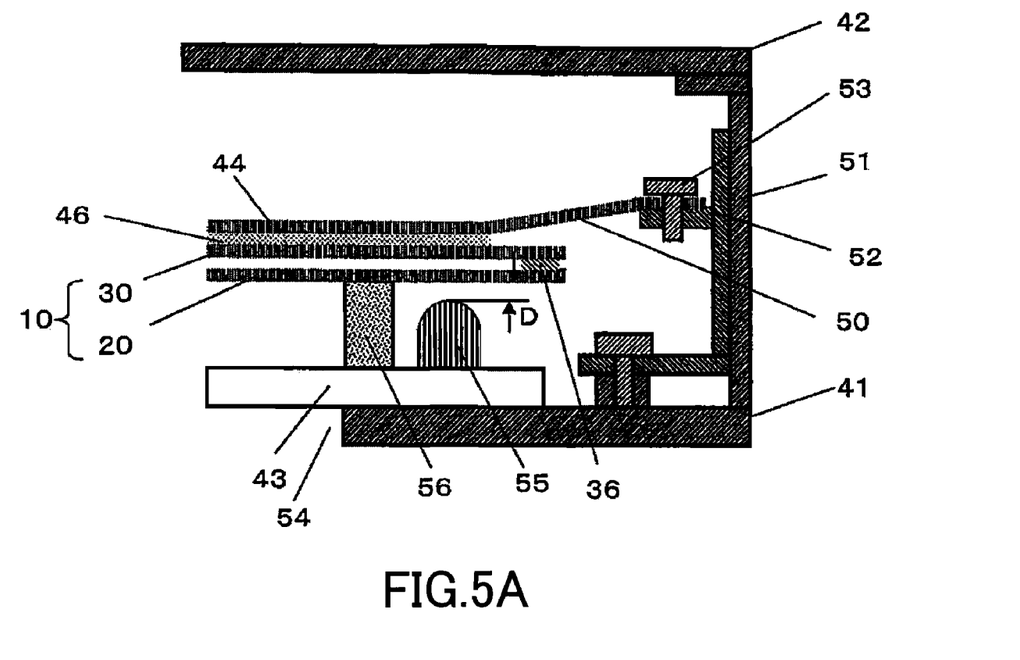
FIG. 5A and FIG. 5B each are a partially enlarged cross-sectional view of the plasma display device used as a display device according to Embodiment 1 of the present invention.
Figure 5B:
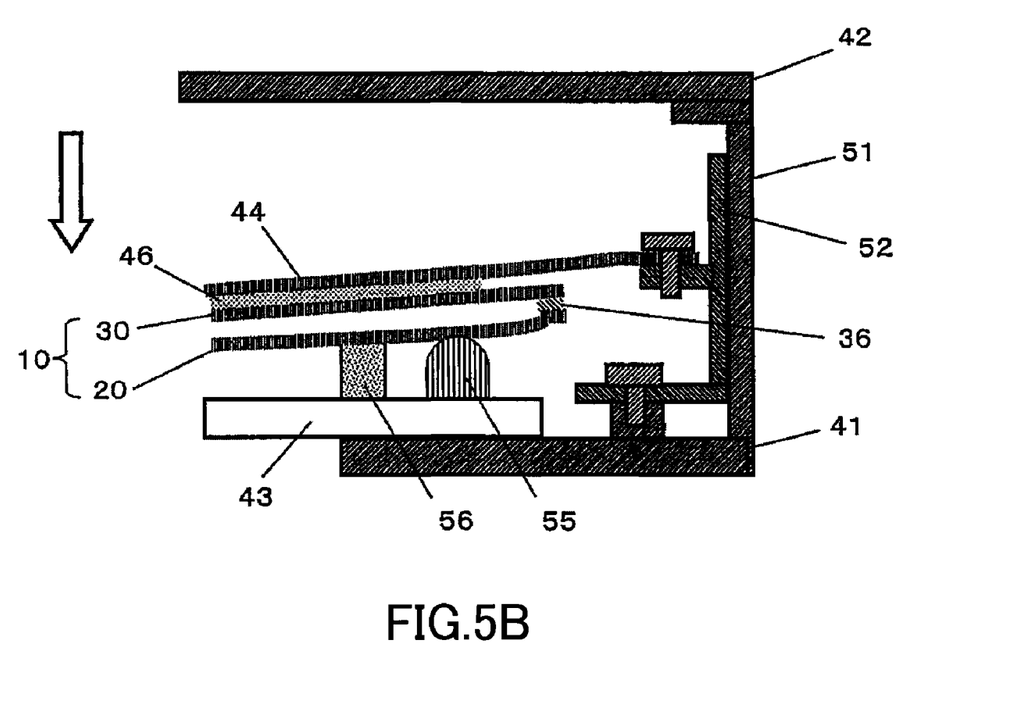

FIG. 5A and FIG. 5B each are a partially enlarged cross-sectional view of the plasma display device used as the display device according to Embodiment 1 of the present invention. FIG. 5A shows the plasma display device in a stationary state before the impact of forward dropping is applied. FIG. 5B shows the plasma display device when dropping forward. The configurations shown in FIG. 5A and FIG. 5B are the same as those shown in FIG. 4A and FIG. 4B, except for the following.

More specifically, in Embodiment 1 of the present invention, a supporting member 55 is disposed on the front protective glass substrate 43 at a location between the sealing material 36 of the PDP 10 and the opening 54. The supporting member 55 forms specified gap D between itself and the front panel 20 in a stationary state. Furthermore, a dust-proofing member 56, such as a sponge, for protection against dust is loaded between the front panel 20 and the front protective glass substrates 43 in a compressed state at a location on an inner side of the supporting member 55, that is, at a location closer to the opening than the supporting member 55.

The specified gap D is set to a level (2 mm to 3 mm, for example) that allows the front panel 20 to contact the supporting member 55 when the front panel 20 is warped at the forward dropping. More specifically, the supporting member 55 is spaced apart from the front panel 20 usually, and restricts the deflection of the front panel 20 by contacting the front panel 20 when the front panel 20 is warped toward the front protective glass substrate 43. In the present embodiment, the supporting member 55 is composed of a projection formed on the front protective glass substrate 43. The supporting member 55 may be made of metal, but preferably is made of an elastic material, such as rubber and resin, having appropriate elasticity. It is desirable that the supporting member 55 having a frame shape be provided along an outline of the PDP 10 in the same manner as the sealing member 36. Alternatively, a plurality of the supporting members 55 may be provided at specified locations.

Moreover, as for a distance between the supporting member 55 and the sealing member 36, it is desirable that the supporting member 55 be spaced apart from the sealing material 36 as much as possible outside of the opening 54 when the gap D is constant. In FIG. 5A and FIG. 5B, only the one supporting member 55 is provided toward the opening 54. However, a plurality of the supporting members 55 may be provided toward the opening 54, and furthermore, the gap D may be different for each of the supporting members 55.

FIG. 5B shows the plasma display device when dropping forward, with an arrow indicating the dropping direction. Due to the impact of the forward dropping during transportation or unpacking, the PDP 10 and the chassis member 44 are warped downward, and the front panel 20 tends to be warped with a larger deflection amount taking the sealing material 36 as the supporting point. However, according to Embodiment 1 of the present invention, the front panel 20 contacts the supporting member 55 when the front panel 20 is warped a specified amount, that is, only the distance of the gap D, and thus the deflection can be restricted. Therefore, it is possible to suppress the stress applied to the sealing material 36, and suppress cracks and fractures from occurring in the sealing material 36 and the front glass substrate 21 composing the front panel 20.

Since the supporting member 55 is not in contact with the front panel 20 in a stationary state, there occur no problems such that an initial impact force is applied directly to the front panel 20, and that the front panel 20 tends to have fractures easily because of cracks occurring due to the concentrated distortion.

(Embodiment 2)

Figure 6A:
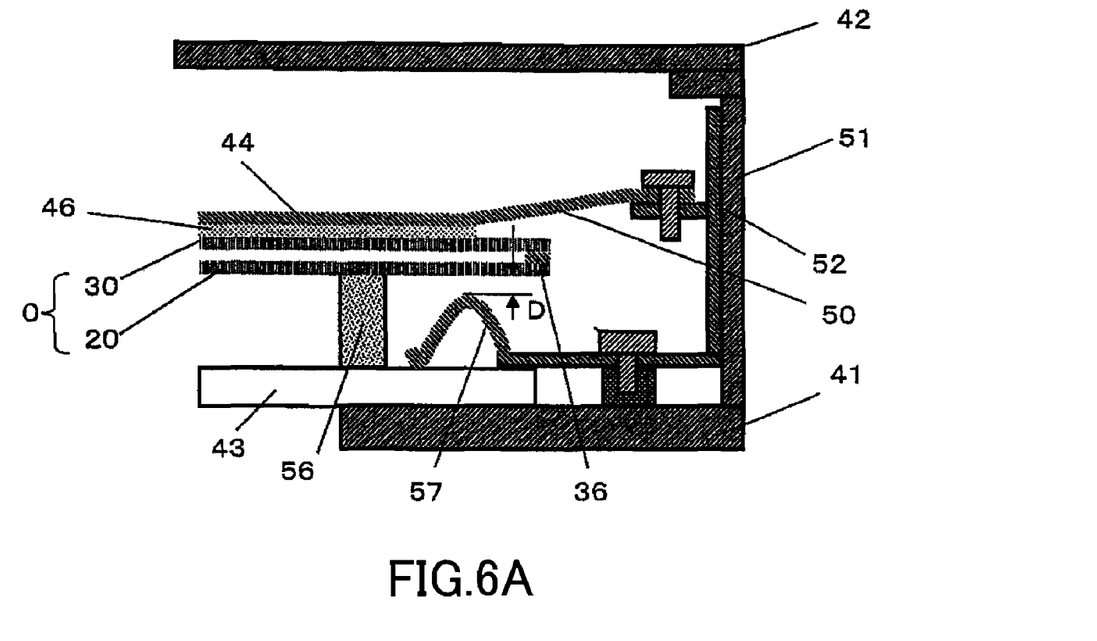
FIG. 6A and FIG. 6B each are a partially enlarged cross-sectional view of the plasma display device used as a display device according to Embodiment 2 of the present invention.
Figure 6B:
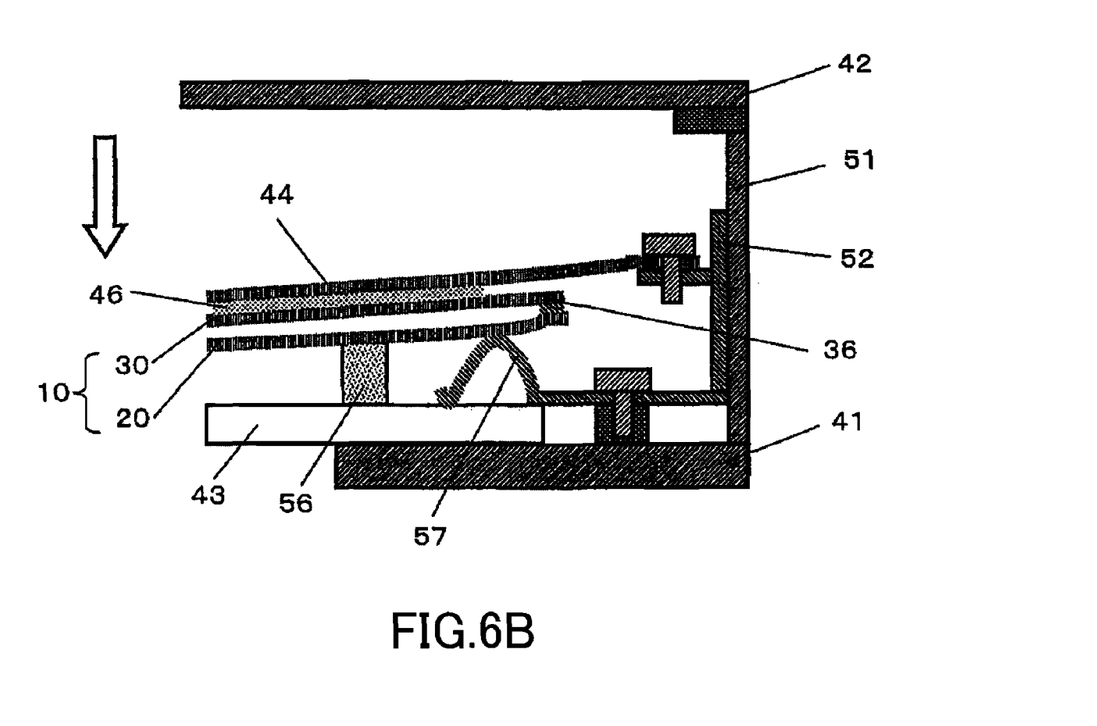

FIG. 6A and FIG. 6B each are a partially enlarged cross-sectional view of the plasma display device used as a display device according to Embodiment 2 of the present invention. FIG. 6A shows the plasma display device in a stationary state before the impact of forward dropping is applied. FIG. 6B shows the plasma display device when dropping forward. As shown in FIG. 6A and FIG. 6B, Embodiment 2 of the present invention is different from Embodiment 1 in that a supporting member 57 is composed of a plate member bent into a shape projecting toward the front panel 20. The members that are identical to those used in Embodiment 1 are indicated with the same reference numerals and descriptions thereof are omitted.

In Embodiment 2 of the present invention, the supporting member 57 is obtained by extending the side housing mounting part 52 that is used for attaching the PDP 10 and the chassis member 44 to the side housing portion 51 and the front housing portion 41, and by bending the side housing mounting part 52 into a shape projecting toward the front panel 20. Thus, the supporting member 57 is integrated with the side housing mounting part 52. A top portion of the projection of the supporting member 57 is spaced apart from the front panel 20 with only the specified gap D therebetween, as in Embodiment 1.

Hereinafter, the behavior of the plasma display device when dropping forward will be described using FIG. 6B. Due to the impact of the forward dropping indicated by the arrow, the PDP and the chassis member 44 are warped downward, and the front panel 20 also is warped downward taking the sealing material 36 as the supporting point. However, according to Embodiment 2 of the present invention, the front panel 20 contacts the supporting member 57 when the front panel 20 is warped a specified amount, that is, only the distance of the gap D, and thus the deflection can be restricted. Therefore, it is possible to suppress the stress applied to the sealing material 36 and suppress cracks and fractures from occurring in the sealing material 36 and the front glass substrate 21 composing the front panel 20.

Moreover, it is possible to form the supporting member 57 integrally with the side housing mounting part 52 by bending a metal plate. Thereby, the parts count can be reduced. Furthermore, it is possible to allow the supporting member 57 to have elasticity by leaving an end of the bent metal plate free. Thereby, it is possible to reduce further the impact force generated when the front panel 20 contacts the top portion of the supporting member 57.

(Embodiment 3)

Figure 7A:
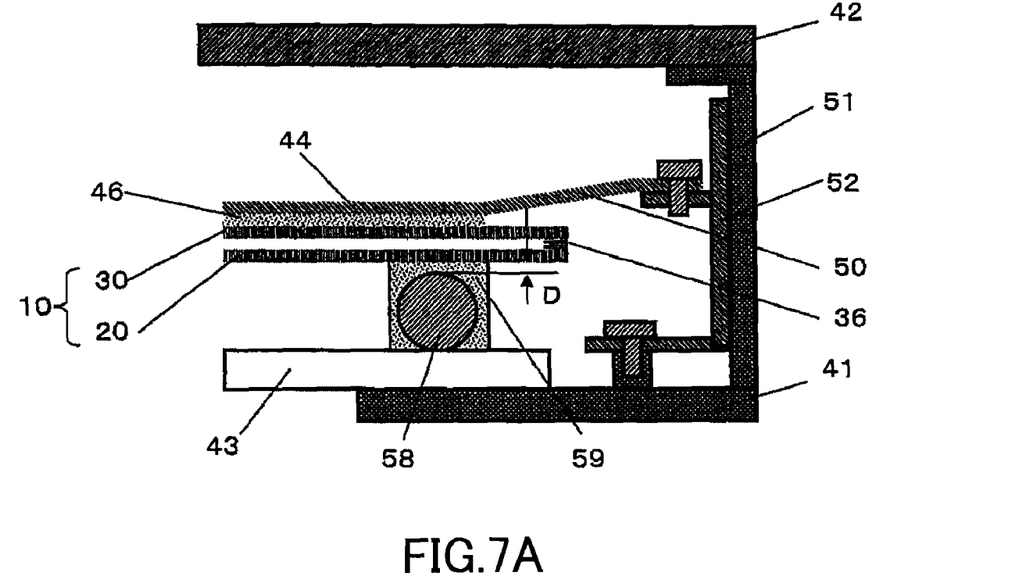
FIG. 7A and FIG. 7B each are a partially enlarged cross-sectional view of the plasma display device used as a display device according to Embodiment 3 of the present invention.
Figure 7B:
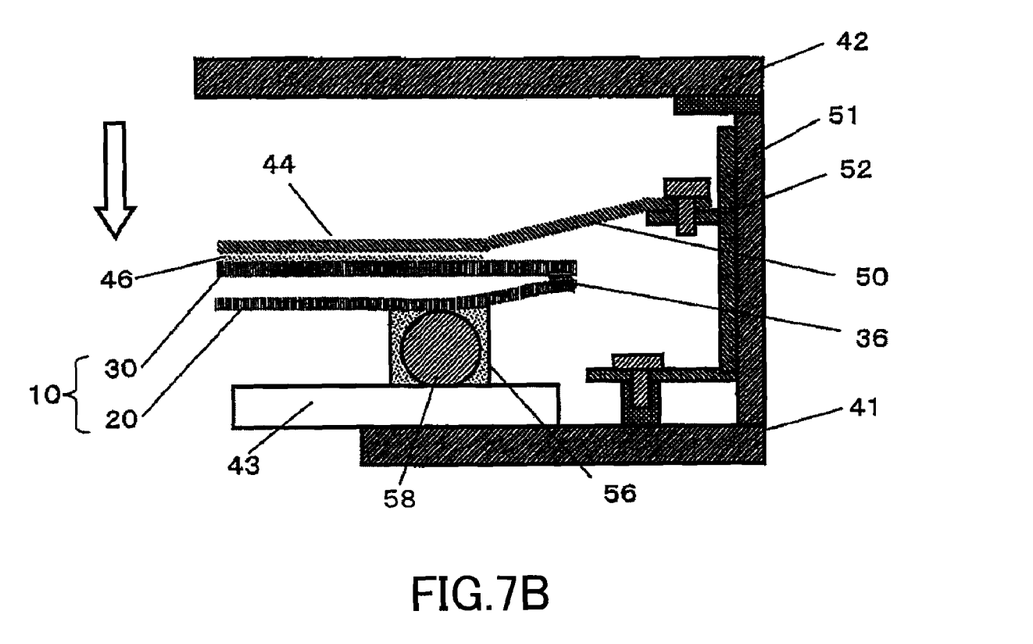

FIG. 7A and FIG. 7B each are a partially enlarged cross-sectional view of the plasma display device used as a display device according to Embodiment 3 of the present invention. FIG. 7A shows the plasma display device in a stationary state before the impact of forward dropping is applied. FIG. 7B shows the plasma display device when dropping forward. As shown in FIG. 7A and FIG. 7B, Embodiment 3 of the present invention is different from Embodiment 1 and Embodiment 2 in that a supporting member 58 is contained in a dust-proofing member 59 that is an elastic member. The supporting member 58 has a higher hardness than that of the dust-proofing member 59. As the supporting member 58, an elastic body, such as rubber and resin, may be contained in a dust-proofing sponge serving as the dust-proofing member 59, for example. With such a configuration, the dust-proofing function performed by the dust-proofing member 59 and the function of restricting the deflection of the front panel 20 performed by the supporting member 58 contained in the dust-proofing member 59 can be achieved with a single component. Furthermore, since only the one component is inserted between the front panel 20 and the front protective glass substrate 43, it is possible to reduce the area of a region outside an effective pixel region and make a so-called frame region smaller.

According to Embodiment 3 of the present invention, the impact generated by forward dropping is alleviated by the dust-proofing member 59 in an early stage, and by the supporting member 58 contained in the dust-proofing member 59 in a secondary stage. Thus, it is possible to alleviate the impact force generated when the front panel 20 contacts with the supporting member 58 and suppress the breakage of the front panel. Furthermore, this configuration can reduce the deflection of the front panel 20 and suppress the distortion in the vicinity of the sealing material 36 so as to prevent cracks and fractures from occurring.

Embodiment 1 to Embodiment 3 each describes an example in which the supporting member is provided on the front protective glass substrate. However, the supporting member may be provided on the front housing portion outside of the front protective glass substrate.

In Embodiment 1 to Embodiment 3, when the supporting member is a linear projection extending along the outline of the PDP 10, the top portion of the supporting member, which is in contact with the front panel, on a side of the front panel preferably is made into a shape having a specified curvature (for example, an curvature radius of 1 mm or more, preferably 3 mm or more) at a cross section in a direction perpendicular to a direction in which the supporting member extends. More specifically, it is preferable that an end portion of the supporting member on the side of the front panel is projected so as to form a gentle arc toward the front panel. Thereby, it is possible to suppress damage from occurring to the front panel when the end portion of the supporting member contacts the front panel.

Moreover, in Embodiment 1 to Embodiment 3 of the present invention, the supporting member neither presses the front panel to cause distortion nor damages the front panel because the supporting member is not in contact with the front panel in a stationary state in which no impact force is applied.

Industrial Applicability

As described above, the present invention can realize a display device in which a display panel is not damaged even by the impact generated when the display device drops during handling with a reduced amount of shock-absorbing packing material used. The present invention particularly is useful for display devices with a big screen.

The invention claimed:

1. A display device comprising:
   a display panel including a front panel and a back panel that have peripheral portions joined to each other by a sealing material;
   a chassis member joined to the back panel of the display panel, and
   a housing enclosing the display panel and the chassis member, wherein:
   the housing includes a front housing portion provided with an opening corresponding to an effective display region of the front panel, a front protective glass substrate fixed to the front housing portion so as to close the opening, a side housing portion coupled to the front housing portion, and a back housing portion that is coupled to the side housing portion and covers a back surface of the chassis member, and
   a supporting member provided on the front protective glass substrate or the front housing portion so as to sit between the sealing material of the display panel and the opening, the supporting member being configured to be spaced apart from the front panel in a normal state of the front panel and to restrict deflection of the front panel by contacting the front panel when the front panel is warped toward the front protective glass substrate, and being contained in an elastic member inserted between the front panel and the front protective glass substrate or between the front panel and the front housing portion.

2. The display device according to claim 1, wherein the supporting member is composed of an elastic body having a higher hardness than that of the elastic member.

3. The display device according to claim 1, wherein an end portion of the supporting member on a side of the front panel has a specified curvature.

* * * * *